Sept. 24, 1957 M. MALLORY 2,807,250
GASOLINE ENGINE
Filed Nov. 22, 1955 3 Sheets-Sheet 1
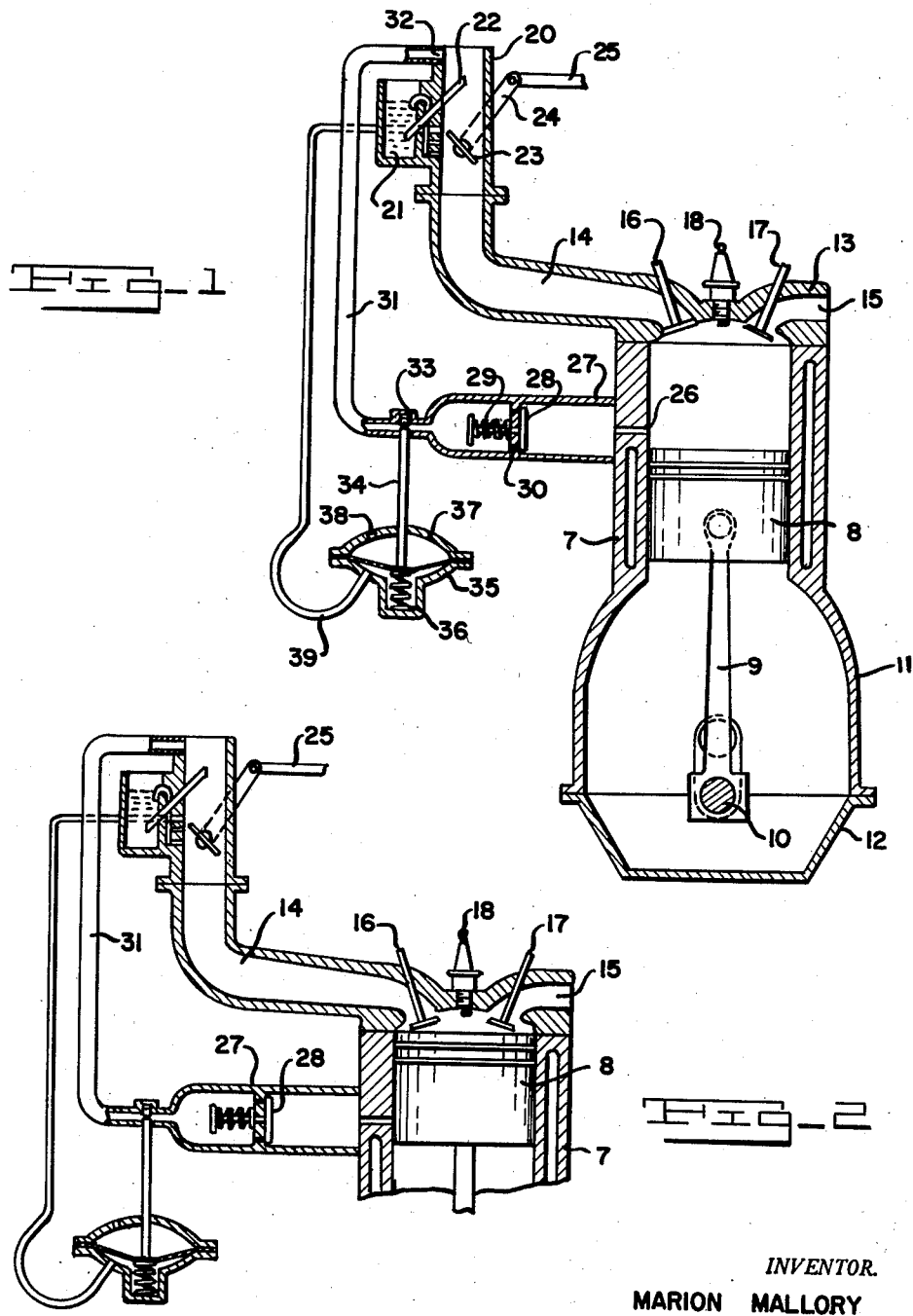
INVENTOR.
MARION MALLORY
BY Edward M. Apple
ATTORNEY

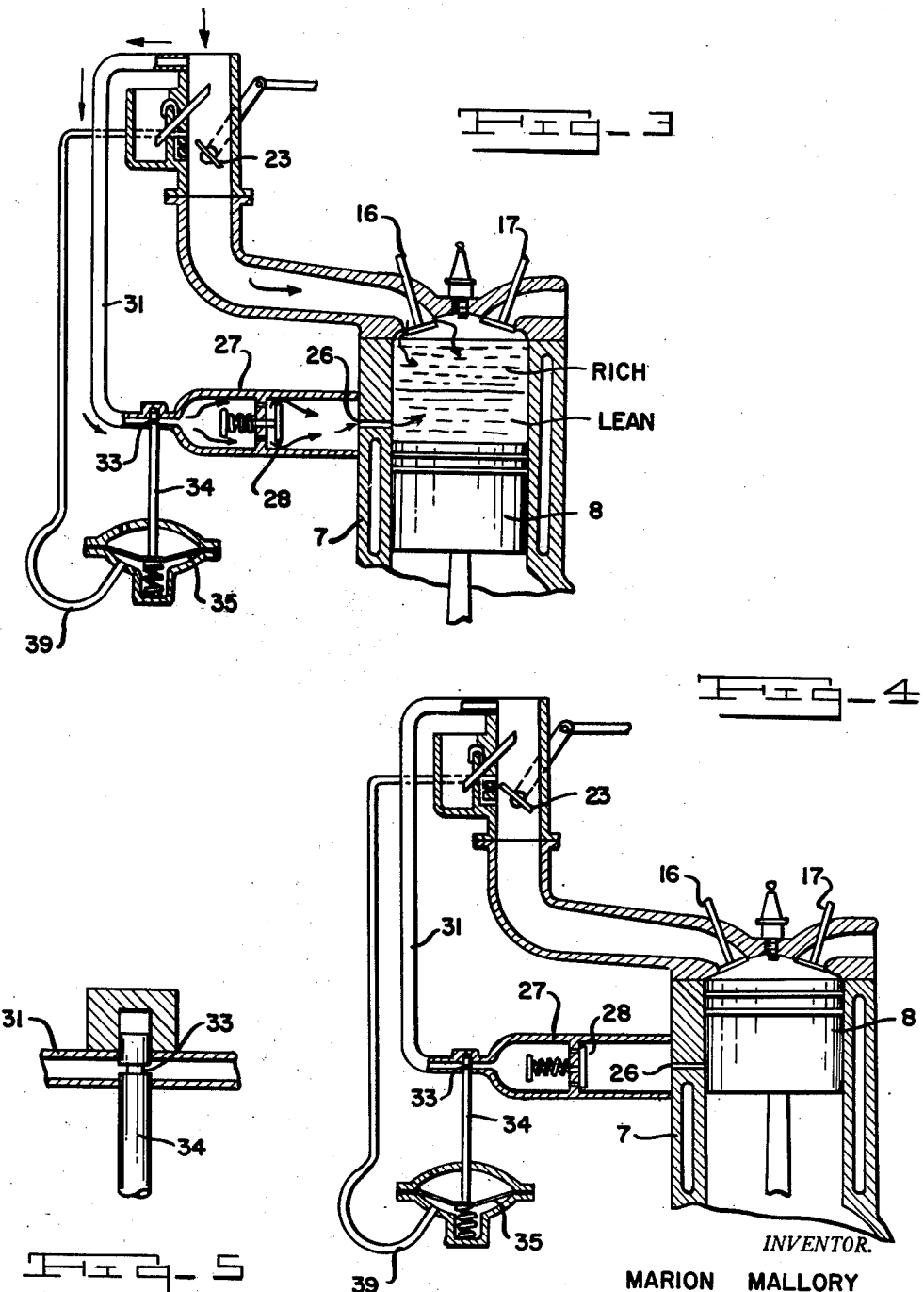

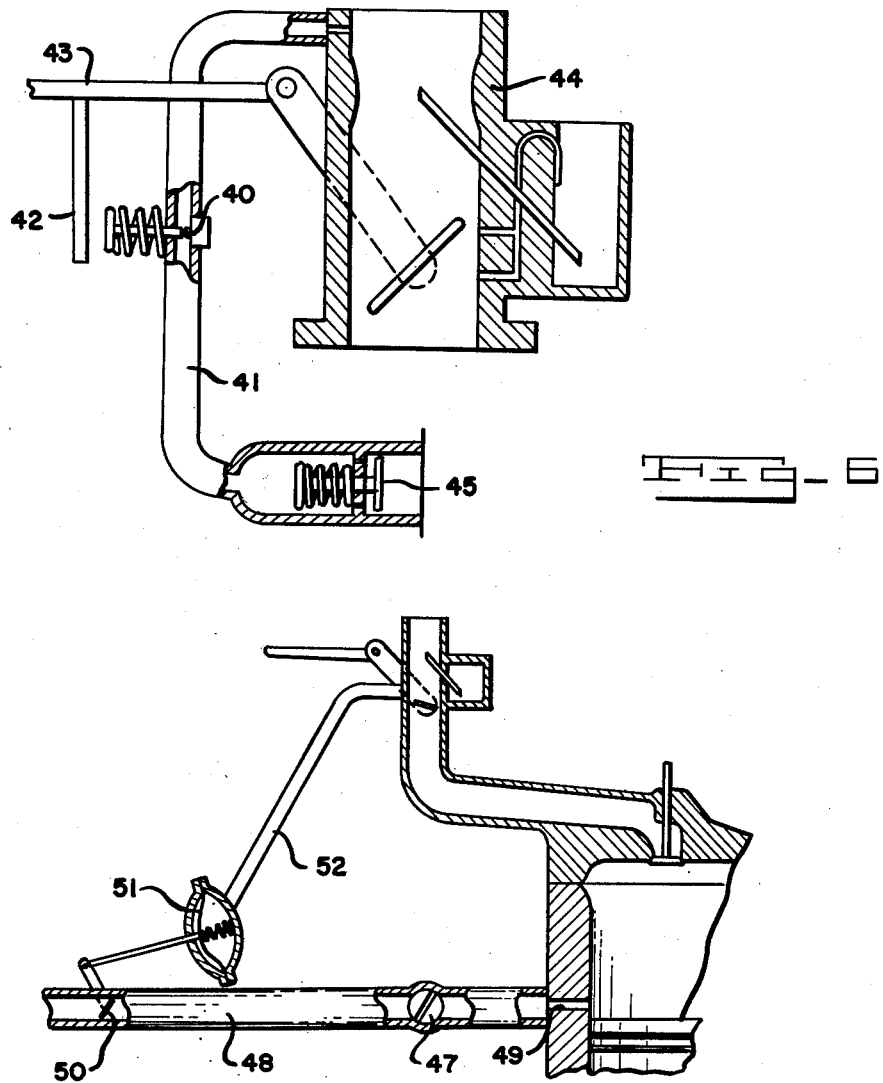

United States Patent Office 2,807,250
Patented Sept. 24, 1957

2,807,250

GASOLINE ENGINE

Marion Mallory, Detroit, Mich.

Application November 22, 1955, Serial No. 548,511

8 Claims. (Cl. 123—75)

This invention relates to internal combustion engines, of the type utilizing gasoline for fuel, and has particular reference to means for stratifying the charge, through the expedient of separating the carbureted charge from a secondary air charge, whereby to increase the compression of the engine during light load or part throttle, and to effect increased economy of operation.

The compression ratios of the modern high-speed gasoline engine have been greatly increased, nevertheless, the over-all efficiency of the engine, and the miles per gallon economy, are extremely low, for the simple reason that the engine is operated, a great percentage of the time, on only a partly opened throttle, or under light load, which in a carbureted engine prevents a full fuel charge from entering the cylinder. A poorly compressed charge results in poor economy, because it produces but little power. Diesel engines are more efficient because they operate under full compression at all times.

It is therefore, an object of this invention to provide a gasoline engine, which has the improved economy of a diesel type engine. In order to accomplish the result indicated, I propose to greatly increase the compression of the engine, when the throttle is moved toward closed position and at the same time provide a comparatively lean mixture in the lower end of the cylinder, leaving the mixture in the upper part of the cylinder sufficiently rich for good combustion.

Another object of the invention is to provide a gasoline powered engine, which is constructed and arranged, whereby a full power mixture is drawn into the cylinder on the intake stroke, as in conventional practice, there being means to also introduce an additional charge of air, between the full power mixture strata and the piston, on the intake stroke, whereby there results a stratified condition in the cylinder, on the intake stroke, which stratified condition forms a full power, rich mixture, at the top of the cylinder, and a comparatively lean mixture, immediately below the rich mixture strata, whereby the compression of the charge is greatly increased.

The foregoing and other objects and advantages of the invention will become more apparent as the description proceeds, reference being made from time to time to the accompanying drawing forming part of the within disclosure in which drawing:

Fig. 1 is a vertical section taken through an engine embodying the invention, and shows the position of the parts at the beginning of the exhaust stroke, when the engine is being operated under light load, or at part throttle.

Fig. 2 is a view, similar to Fig. 1, with parts broken away, but showing the position of the parts at the end of the exhaust stroke.

Fig. 3 is a view similar to Fig. 1 with parts broken away, showing the position of the parts of the engine at the end of the intake stroke.

Fig. 4 is a view similar to Fig. 1 with parts broken away, but showing the position of the parts of the engine at the end of the compression stroke.

Fig. 5 is an enlarged fragmentary detail of one of the air control valves.

Fig. 6 is an enlarged fragmentary detail, showing a modified form of control for the air intake valves.

Fig. 7 is a view illustrating another modified form of control, for the air intake valves.

Referring now more particularly to the drawings, it will be understood that in the embodiment herein disclosed, the reference character 7 indicates the cylinder of an internal combustion engine, having a piston 8 reciprocable therein, and having a connecting rod 9, a crank shaft 10, crank case 11 and an oil pan 12, as in conventional practice. The engine is also provided with a conventional cylinder head 13, having an intake passage-way 14, and an exhaust passage-way 15, in which passage-ways are respectively the intake valve 16 and the exhaust valve 17. The reference character 18 indicates a conventional spark plug for igniting the charge. The reference character 20, indicates a carburetor, having a fuel reservoir 21, a fuel jet 22, a throttle valve 23 and linkage 24 and 25, for operating the throttle 23. The elements heretofore described are conventional in automotive practice. I will now describe the elements which are combined with the conventional elements heretofore referred to, to effect the new results which I claim from my invention.

Positioned in the side wall of the cylinder 7, as at 26, is an air-intake port, which is arranged to be uncovered by the piston 8. Secured to the cylinder wall 7, by any suitable means, so as to be in communication with the port 26, is a valve housing 27, which houses a poppet valve 28, which is spring backed as at 29, and which valve 28 is adapted to be operated by means of suction developed in the cylinder. The valve 28 rests on a valve seat 30. The opposite end of the housing 27, is reduced and communicates with a tube 31, which in turn communicates with an air-intake port 32, positioned above the carburetor throttle 23. Positioned in the air-line 31 is a plunger valve 33, which plunger valve, when open as shown in Fig. 1, permits air to enter the valve housing 27, back of the valve seat 30. The rod 34, of the valve 33, is secured to a diaphragm 35, which is spring backed as at 36. The diaphragm 35, and spring 36, are housed in a housing 37, one side of which is open to atmosphere, as at 38, and the other side of which is connected to the suction side of the engine, through a tube 39, which communicates with a port 40.

A typical operating cycle of the engine is illustrated in Figs. 1 to 4 inclusive. In Fig. 1, the intake valve 16 is closed, the exhaust valve 17 is open, and the piston 8 is starting its upward travel on the exhaust stroke. When the piston reaches the end of the exhaust stroke, as shown in Fig. 2, the intake valve 16 is starting to open, and the exhaust valve 17 is starting to close. Upon the completion of the exhaust stroke, the piston 8 starts downward on its intake stroke. As the piston 8 starts downward, on the intake stroke, a rich full power mixture is drawn in around the intake valve 16, and tends to remain in the upper portion of the cylinder 7. As the piston 8, continues its downward movement on the intake stroke, it uncovers the port 26, placing the interior of the valve housing 27 in communication with the interior of the cylinder. So long as the throttle 23, is in the partly open position, the vacuum in the intake manifold, between the throttle 23 and the engine, is very high, and in conventional engines the charge in the cylinder, and its compression would be comparatively low. In my improved device herein described, the high vacuum just indicated will cause the valve 28, to open, permitting additional air to be drawn into the cylinder, through the port 26 and the conduit 31. At the same time, the high vacuum between the throttle 23 and the engine, will cause the diaphragm 35, to open the plunger valve 33. The air entering the cylinder through the port 26, on the intake stroke of the piston 8, will pass into the lower part of the cylinder, beneath the rich, full load, mixture that was drawn into the cylinder through the carburetor with the result that I produce a stratified condition of the charge in the cylinder. That is, there is a rich, full power, mixture in the upper portion of the cylinder and a comparatively lean mixture in the lower part of the cylinder, at the beginning of the compression stroke. This results in a greatly increased compression in the cylinder and when the spark occurs, the charge will be fired under very high compression. This stratified charge, rich above and lean below, is ignited in the rich combustible mixture, and expands the leaner mixture, which is in the lower part of the cylinder.

Were it not for the automatic valve 28, the exhaust gases would blow back through the port 26. But the exhaust pressure forces the valve 28 to close, and it will only open, when there is sufficient suction on it, from the cylinder and the high vacuum in the intake manifold, between the throttle valve 23, and the engine. When the throttle 23, is wide open for full power, the vacuum will be low in the manifold and on the diaphragm 35, at which time, neither of the valves 33 or 28 will be open. At full throttle, the engine will be running on conventional carburetion, and all of the charge will then come through the carburetor. It is intended that the additional charge of air will only be used when the engine is running on light load and with part throttle.

In Fig. 6, I show a modified form of device in which the valve 40, which controls the air line 41, is mechanically operated by an extension 42, on the throttle rod 43, of the carburetor 44. The poppet valve 45, operates as previously described.

In Fig. 7, I show a further modified form of control, in which a rotary valve 47 is interposed in the air line 48. The valve 47, may be driven by the engine crank shaft at ¼ engine speed, so that it will open the passage-way to the port 49, in the cylinder wall when the piston is nearing the bottom of the intake stroke. In this embodiment, a throttle valve 50, is operated by manifold vacuum through a diaphragm 51 and vacuum tube 52. In other respects, the device functions as previously described.

It will be understood that by segregating the rich, carbureted, mixture from the charge of air admitted through the port 26, there will always be a rich, full load, combustible mixture at the upper end of the cylinder, around the spark plug. Therefore, combustion will not be affected, and the admission of a great volume of air into the cylinder, below the rich combustible mixture, will greatly increase the compression, and will make the combustible mixture more powerful, when ignited.

If the same volume of air were admitted into the cylinder, through the carburetor or manifold, the engine would not run, because then the mixture would be entirely too lean in the upper part of the cylinder. My invention therefore, revolves around the novel means for segregating the rich fuel mixture, from the secondary air admitted to the combustion chamber, when the engine is working under light load conditions and under part throttle only, and the means to permit only a carbureted charge to the combustion chamber, when the engine is working under heavy load and full throttle.

Having described my invention, what I claim and desire to secure by Letters Patent is:

1. In a gasoline engine of the character described, including a cylinder, an intake manifold for said cylinder, a carburetor for charging said cylinder, and a throttle, the combination of fully automatic means controlled in part by the vacuum in said manifold up stream from the throttle for introducing a charge of air into said cylinder, after said cylinder has received a fuel charge from said carburetor and when the said engine is operated at part throttle, or under light load.

2. The structure of claim 1, in which said means include a valve in a passageway in communication with said cylinder operable by engine suction, and a second valve in said passageway removed from said first named valve and controlled by a suction device operable by the high vacuum in the engine intake manifold up stream from said throttle, both said valves being closed when the engine is running at full load or open throttle.

3. In a gasoline engine of the character described, including a cylinder, an intake manifold, a piston, a carburetor for charging said cylinder, and a throttle, the combination of automatically controlled means for admitting air directly to the cylinder toward the end of the intake stroke and after the carburetor charge, and while the engine is under light load or on part throttle, and automatic means for rendering inoperative said first named means when said engine is on full throttle or heavy load, said first named means including a port in the cylinder wall of the engine arranged to be uncovered by the engine piston, a valve housing covering the outside of said port, a spring loaded valve in said housing operable by engine suction for introducing air to the cylinder, said last named means including a suction tube, connected at one end, to said housing up stream of said valve, and connected at the other end to a port positioned in the intake manifold of the engine up stream from the throttle.

4. In a gasoline engine of the character described, including a cylinder, an intake manifold, a piston, a carburetor for charging said cylinder, and a throttle, the combination of automatically controlled means for admitting air directly to the cylinder toward the end of the intake stroke and after the carburetor charge, and while the engine is under light load or on part throttle, and automatic means for rendering inoperative said first named means when said engine is on full throttle or heavy load, said first named means including a port in the cylinder wall of the engine arranged to be uncovered by the engine piston, a valve housing covering the outside of said port, a spring loaded valve in said housing for admitting air to said cylinder, and said last named means including an air tube, connected at one end, to said housing up stream from said valve, and connected at the other end to a port positioned in the intake manifold of the engine up stream from the throttle, a valve in said air tube, a diaphragm assembly for actuating said last named valve and a vacuum line connected to said diaphragm assembly and to a port positioned in the intake manifold near said throttle, and arranged to close said last named valve when the suction in said manifold reaches a predetermined point.

5. In a gasoline engine of the character described, including a cylinder, a piston, a carburetor for charging said cylinder, a throttle, and manual means for controlling said throttle, the combination of a port in the cylinder of the engine, arranged to be uncovered by the engine piston, an air conduit in communication with said port, a spring loaded valve in said conduit, arranged to be opened by suction developed in said engine to permit the entrance of air to the cylinder after the charge, a second spring loaded valve in said air conduit, and means on said manual throttle control means for controlling said last named valve, whereby to close said air conduit when said throttle is wide open, and to open said air conduit when said throttle is only partly open.

6. In a gasoline engine of the character described, including a cylinder, a piston, a carburetor for charging said cylinder, an intake manifold, and a throttle for controlling said manifold, the combination of a port in the cylinder of said engine, arranged to be uncovered by the engine piston, an air conduit in communication with said port, a valve in said air conduit, timed to open and close with the operation of said engine, whereby to introduce air to said cylinder after the carburetor charge, a second valve in said air conduit, and means responsive to the vacuum in said intake manifold, for controlling said last named valve.

7. In a gasoline engine of the character described, including a cylinder, a piston, a carburetor for charging said cylinder, an intake manifold, and a throttle for controlling said manifold, the combination of a port in said engine, arranged to be uncovered by the engine piston, an air conduit in communication with said port, a rotary valve in said air conduit timed to open and close with the operation of said engine, whereby to introduce air to said cylinder after the carburetor charge, a second valve in said air conduit, and means responsive to the suction in said intake manifold, for controlling said last named valve.

8. In a gasoline engine of the character described, including a cylinder, a piston, a carburetor for charging said cylinder, an intake manifold, and a throttle for controlling said manifold, the combination of a port in said engine, arranged to be uncovered by the engine piston, an air conduit in communication with said port, a rotary valve in said air conduit timed to open and close with an operation of said engine, whereby to introduce air to said cylinder after the carburetor charge, a second valve in said air conduit, and means operable by the throttle for controlling said last named valve.

References Cited in the file of this patent

UNITED STATES PATENTS

| | | |
|---|---|---|
| 1,477,363 | Kessler | Dec. 11, 1923 |
| 1,513,997 | Ingram | Nov. 4, 1924 |
| 1,589,662 | Ricardo | June 22, 1926 |